United States Patent
Marcus et al.

(10) Patent No.: US 10,448,078 B2
(45) Date of Patent: Oct. 15, 2019

(54) METHODS, SYSTEMS, AND COMPUTER-READABLE MEDIA FOR TARGETED DISTRIBUTION OF DIGITAL ON-SCREEN GRAPHIC ELEMENTS

(71) Applicant: Visible World, LLC, Philadelphia, PA (US)

(72) Inventors: Claudio Marcus, Andover, NH (US); Seth Haberman, New York, NY (US)

(73) Assignee: Visible World, LLC, Philadelphia, PA (US)

( * ) Notice: Subject to any disclaimer, the term of this patent is extended or adjusted under 35 U.S.C. 154(b) by 0 days.

(21) Appl. No.: 14/731,956

(22) Filed: Jun. 5, 2015

(65) Prior Publication Data
US 2015/0358664 A1 Dec. 10, 2015

Related U.S. Application Data

(60) Provisional application No. 62/008,055, filed on Jun. 5, 2014.

(51) Int. Cl.
H04N 21/2668 (2011.01)
H04N 21/25 (2011.01)
(Continued)

(52) U.S. Cl.
CPC ......... H04N 21/2668 (2013.01); G06Q 30/02 (2013.01); H04N 21/251 (2013.01);
(Continued)

(58) Field of Classification Search
CPC ........... H04N 21/2625; H04N 21/2393; H04N 21/6473; H04N 21/2668; H04N 21/23418;
(Continued)

(56) References Cited

U.S. PATENT DOCUMENTS 8,572,639 B2 * 10/2013 Ficco ................... H04H 20/106
725/14
8,583,484 B1 * 11/2013 Chalawsky ...... H04N 21/23424
705/14.43
(Continued)

OTHER PUBLICATIONS

International Search Report and Written Opinion dated Sep. 15, 2015, from corresponding International No. PCT/US15/34423, filed Jun. 5, 2015.

Primary Examiner — Hai V Tran
(74) Attorney, Agent, or Firm — BakerHostetler

(57) ABSTRACT

Systems and methods for presenting targeted digital on-screen graphics are described. A content originator, such as an advertiser or media network operator, may specify targeted segments and/or targeted digital on-screen graphics to be presented to one or more viewers of an available audience. The expected presentation of a digital on-screen graphic on a content presentation device associated with targeted segments may be detected. A target digital on-screen graphic may be transmitted or otherwise made available to the content presentation device. The targeted digital on-screen graphic may be displayed instead of or overlaying at least a portion of the original digital on-screen graphic, such that all or a portion of the original digital on-screen graphic is substituted by the target digital on-screen graphic.

17 Claims, 4 Drawing Sheets

(51) Int. Cl.
*H04N 21/431* (2011.01)
*H04N 21/442* (2011.01)
*H04N 21/458* (2011.01)
*H04N 21/466* (2011.01)
*H04N 21/81* (2011.01)
*H04N 21/426* (2011.01)
*G06Q 30/02* (2012.01)

(52) U.S. Cl.
CPC ... *H04N 21/42684* (2013.01); *H04N 21/4312* (2013.01); *H04N 21/44222* (2013.01); *H04N 21/458* (2013.01); *H04N 21/4667* (2013.01); *H04N 21/812* (2013.01); *H04N 21/8153* (2013.01)

(58) Field of Classification Search
CPC ........... H04N 21/4788; H04N 21/8133; H04N 21/4318; H04N 21/4725; H04N 21/458; H04N 21/262; H04N 21/23424; H04N 21/812; H04N 21/8586; H04N 21/4524; H04N 21/2407; H04N 21/25891; H04N 21/2385; H04N 21/4383; H04N 21/42684; H04N 21/8153; H04N 21/4312; H04N 21/251; H04N 21/4667; H04N 21/44222; G06Q 30/02

USPC ...... 725/35, 34, 32, 14, 98, 90, 52, 135, 42, 725/93, 116, 120, 132
See application file for complete search history.

(56) References Cited

U.S. PATENT DOCUMENTS

| | | |
|---|---|---|
| 2002/0152117 A1 | 10/2002 | Cristofalo et al. |
| 2005/0166233 A1* | 7/2005 | Beyda .................... G06Q 30/02 725/46 |
| 2008/0276266 A1 | 11/2008 | Huchital et al. |
| 2008/0276270 A1 | 11/2008 | Kotaru et al. |
| 2010/0122287 A1* | 5/2010 | Beyabani ............... G06Q 30/02 725/32 |
| 2012/0106920 A1* | 5/2012 | Fitzsimmons ......... H04N 5/775 386/230 |
| 2013/0080242 A1 | 3/2013 | Alhadeff et al. |
| 2013/0179917 A1 | 7/2013 | Gu et al. |
| 2013/0343727 A1* | 12/2013 | Rav-Acha ........... G11B 27/031 386/282 |
| 2014/0282673 A1* | 9/2014 | Neumeier ........ H04N 21/44008 725/19 |

* cited by examiner

METHODS, SYSTEMS, AND COMPUTER-READABLE MEDIA FOR TARGETED DISTRIBUTION OF DIGITAL ON-SCREEN GRAPHIC ELEMENTS

CROSS-REFERENCE TO RELATED APPLICATIONS

This application claims the benefit of U.S. Provisional Application No. 62/008,055, entitled "Method and System to Enable Targeted TV Program Promotion Graphics" and filed on Jun. 5, 2014, the contents of which are incorporated by reference in its entirety as if fully set forth herein.

FIELD OF INVENTION

The present invention generally relates to the targeted distribution of content to consumers and, more specifically, to determining the presentation of digital on-screen graphics on content presentation devices, such as a television, and overlaying the digital on-screen graphics with targeted digital on-screen graphics.

BACKGROUND

The use of digital on-screen graphics have experienced widespread adoption and use by media network operators. A typical digital on-screen graphic includes a digital graphical element embedded in or overlaid on a main content offering, such as a television program (commonly referred to as a "bug"). Initially, digital on-screen graphics were used by broadcast television network providers to identify the particular network. For example, broadcast television networks may include a digital on-screen graphic in the form of symbol or name of the network overlaid over a portion of the main content offering, such as the portion displayed on the lower-right corner of a television screen. Eventually, digital on-screen graphics evolved to include promotional content, animated graphics, and video.

In general, such digital on-screen graphics represent a form of permanent visual identification that aims to increase brand recognition of the networks and their programming. Digital on-screen graphics are generally displayed within the context of the programming and also operate to identify the source of programming and promoted programs even when the content is viewed on a time-shifted basis, such as content recorded using a personal video recorder (for example, a PVR or DVR).

Conventional technology used to generate and air digital on-screen graphics embeds the graphics within the play-out stream, delivering the same graphics to all viewers exposed to the program within which they are embedded. Accordingly, digital on-screen graphics can only be targeted to reach the audience watching the program such that it is not possible to target specific subsets of viewers of the program. Therefore, media network operators and advertisers are not able to use digital on-screen graphics to efficiently and effectively target specific types of viewers. Advertisers and media network operators are not able to minimize the use of graphics that are not effective for certain portions of the audience, for example, network program promotions that do not materially impact the viewing among certain types of viewers. In addition, conventional technology does not provide effective techniques for targeting promotions through digital on-screen graphics to viewers that are more likely to be interested in the promoted material, such as watching a particular promoted program. Accordingly, media network operators and advertisers would benefit from methods that would enable digital on-screen graphics to be targeted to specific audience portions based on characteristics of the viewers.

SUMMARY

This disclosure is not limited to the particular systems, devices and methods described, as these may vary. The terminology used in the description is for the purpose of describing the particular versions or embodiments only, and is not intended to limit the scope.

In an embodiment, a system for distributing targeted on-screen graphics may include a processor and a non-transitory, computer-readable storage medium in operable communication with the processor. The computer-readable storage medium may contain one or more programming instructions that, when executed, cause the processor to receive target information associated with a plurality of content presentation devices, receive campaign information indicating a targeted on-screen graphic to present to at least one target device selected from the plurality of content presentation devices based on the target information, receive expected presentation information indicating an expected presentation of an original on-screen graphic at the at least one target device, and generate targeted presentation information configured to trigger the targeted on-screen graphic to be presented at the at least one target device during a duration that corresponds with the expected presentation such that the targeted on-screen graphic is visible via a display device of the target device and at least a portion of the original on-screen graphic is not visible via the display device.

In an embodiment, a computer-implemented method for distributing targeted on-screen graphics may include, by a processor, receiving target information associated with a plurality of content presentation devices, receiving campaign information indicating a targeted on-screen graphic to present to at least one target device selected from the plurality of content presentation devices based on the target information, receiving expected presentation information indicating an expected presentation of an original on-screen graphic element at the at least one target device, and generating targeted presentation information configured to trigger the targeted on-screen graphic element to be presented at the at least one target device during a duration that corresponds with the expected presentation such that the targeted on-screen graphic element is visible via a display device of the target device and at least a portion of the original on-screen graphic element is not visible via the display device.

In an embodiment, a computer-readable storage medium having computer-readable program code configured to distribute targeted on-screen graphics may include computer-readable program code configured to receive target information associated with a plurality of content presentation devices, computer-readable program code configured to receive campaign information indicating a targeted on-screen graphic to present to at least one target device selected from the plurality of content presentation devices based on the target information, computer-readable program code configured to receive expected presentation information indicating an expected presentation of an original on-screen graphic at the at least one target device, and computer-readable program code configured to generate targeted presentation information configured to trigger the targeted on-screen graphic to be presented at the at least one target device during a duration that corresponds with the expected presentation such that the targeted on-screen graphic is visible via a display device of the target device and at least a portion of the original on-screen graphic is not visible via the display device.

DETAILED DESCRIPTION

Figure 1:
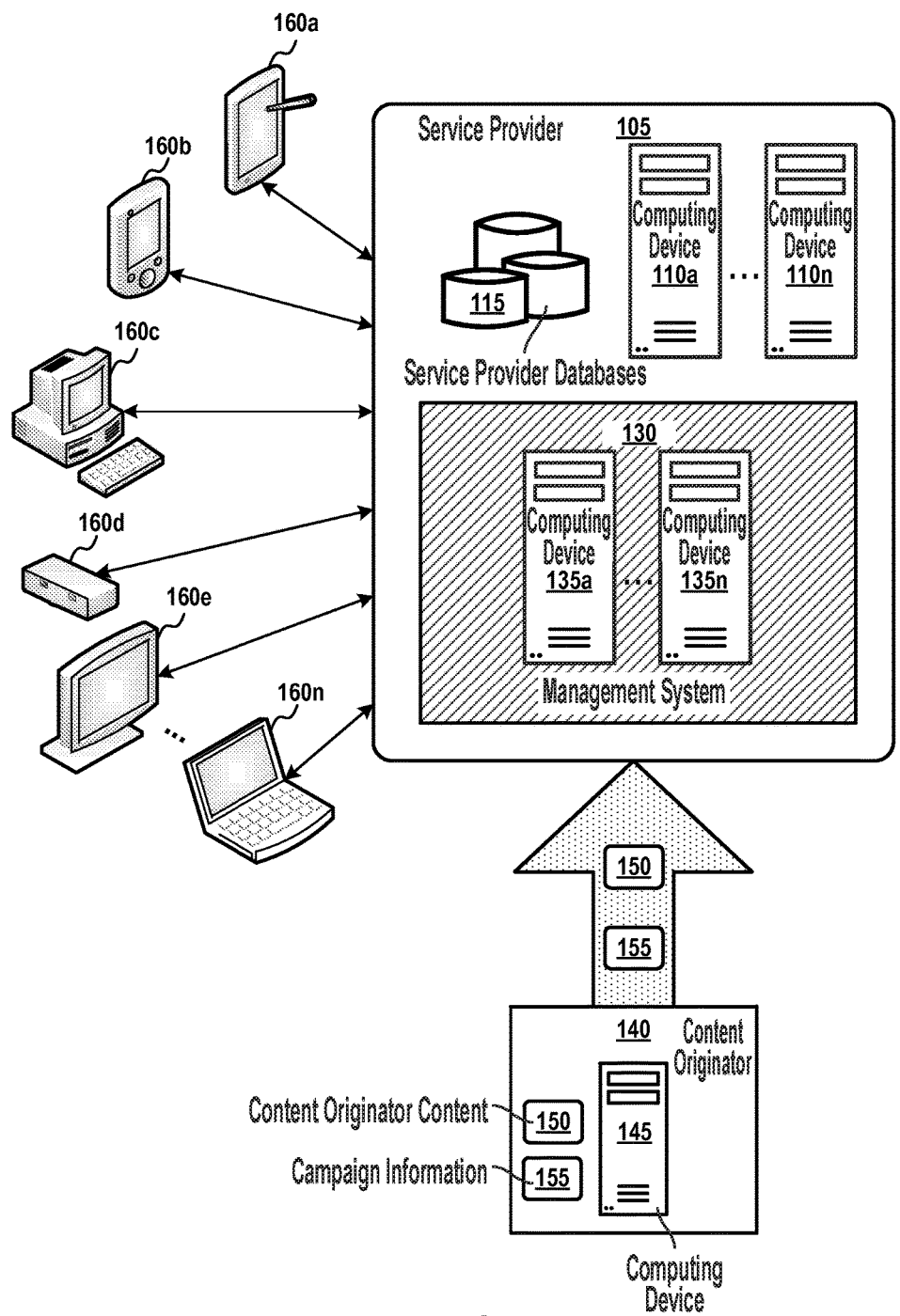
FIG. 1 depicts an illustrative graphic management system according to some embodiments.

In this disclosure, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, a system, and/or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise. As used in this document, the term "comprising" means "including, but not limited to."

The use of the singular herein includes the plural (and vice versa) unless specifically stated otherwise. Moreover, the singular forms "a," "an," and "the" include plural forms unless the context clearly dictates otherwise. In addition, where the use of the term "about" is before a quantitative value, the present teachings also include the specific quantitative value itself, unless specifically stated otherwise.

It should be understood that the order of steps or order for performing certain actions is immaterial so long as the present teachings remain operable. Moreover, two or more steps or actions may be conducted simultaneously.

The terminology used in the description is for the purpose of describing the particular versions or embodiments only, and is not intended to limit the scope.

The described technology generally relates to systems, methods, and computer readable media for presenting targeted digital on-screen graphics to viewers. A digital on-screen graphic may generally include any type of graphical object that may be embedded in, overlaid over, or otherwise displayed with a primary content offering. For example, a digital on-screen graphic may include a symbol of a broadcast network overlaid over a portion of a broadcasted television program (i.e., the primary content offering) (commonly referred to as a "bug"). In another example, a digital on-screen graphic may include a banner displayed over a portion of the television screen during a presentation of a television program, movie, or other content offering. The digital on-screen graphic may include various forms of content (or "graphical elements"), including, without limitation, video, animation, text, pictures, audio, and any combination thereof. The digital on-screen graphic may be embedded in, overlaid over, displayed in, or otherwise presented in combination with the primary content offering using techniques known to those having ordinary skill in the art. For instance, the digital on-screen graphic may be formed as part of the television network play-out stream for the primary content offering.

In some embodiments, a digital on-screen graphic management system ("graphic management system" or "management system") may be configured to facilitate, implement, support, trigger, effectuate, or otherwise cause targeted on-screen digital graphics (or "targeted graphics") to be presented to targeted portions of an available audience ("targets"). The graphic management system may be configured to, among other things, execute a digital on-screen graphic management application ("graphic management application" or "management application") configured to perform various functions described according to some embodiments herein to cause the targeted graphics to be presented to the target audience portion. In some embodiments, the management application may access information for determining which portion of an audience are targets for a targeted graphic. In some embodiments, the management application may generate and/or receive target information associated with an audience and/or content presentation devices thereof that includes data about the audience, such as demographic information, content interaction preferences and/or history (i.e., television content viewing history), or the like. In some embodiments, the graphic management application may be executed by the management system, content presentation devices, and/or computing devices associated with a service provider and/or content originator.

In some embodiments, the management application may generate and/or receive expected presentation information to determine an expected presentation of a digital on-screen graphic within a primary content offering that was originally scheduled to be aired, for example, by a media network operator (a "original digital on-screen graphic" or "original graphic"). In some embodiments, the management application may generate and/or receive targeted presentation information that may be used by the management application, a service provide, and/or a content presentation device to cause the targeted graphic to be viewed by the targets instead of the original graphic. For example, the management application may cause at least a portion of the targeted graphic to be visible to the targets and at least a portion of the original graphic to not be visible to the targets. In some embodiments, the targeted graphic may replace all or some of the original graphic, for instance, in a broadcast stream. In some embodiments, the targeted graphic may be overlaid over at least a portion of the original graphic, thereby blocking a viewer from seeing the at least a portion of the original graphic.

Although advertisers and advertising content may be used in examples in this disclosure, embodiments are not so limited, as any type and form of content capable of operating according to embodiments is contemplated herein.

Content may generally include any type of data, information, media, graphics, visible elements, or the like that may be expressed through a medium. Illustrative mediums may include visual mediums such as television, and broadcast, cable, satellite, and/or network (e.g., the Internet) or streaming forms thereof. Examples of content may include, but are not limited to, video, audio, movies, video games, television and radio programs, commercials, websites, images, photographs, text, electronic or digital documents, information feeds, streaming media, social media, social networks, and/or combinations thereof. In some embodiments, content may include an advertisement, such as a television advertisement or an online advertisement including, without limitation, website advertisements, Internet advertisements, search engine marketing (SEM), social media marketing, and mobile device advertising. A digital on-screen graphic may include content. For example, a digital on-screen graphic may be formed from graphic elements (i.e., pictures, images), video, text, or the like. In general, a digital on-screen graphic may include a particular form of content that is presented along with a primary content offering.

The content may be distributed or broadcast by a service provider to various content presentation devices, with or without digital on-screen graphics. A service provider may generally include any type of entity or structure capable of providing content assets to a content presentation device. For instance, the service provider may include a media network operator, a television broadcast network, a cable television network, a satellite television network, an internet service provider (ISP), a computing device advertising network, a media distribution network, a cloud computing network, a local area network (LAN), a wide area network (WAN), a terrestrial network, a mobile network, and/or any combination thereof. Television networks may include standard definition (SD) and high definition (HD) networks.

In some embodiments, the management system may be configured to operate across physical device platforms, networks, and/or service providers simultaneously. For example, content and digital on-screen graphics may be managed by the management system in association with set-top-boxes over a cable television system, mobile computing devices using standard network communication protocols (for instance, Ethernet or Wi-Fi) over an Internet service provider network, and/or to smart phone devices or other mobile computing devices over standard telecommunication protocols (for instance, 3G, 4G, LTE, or the like).

A content presentation device may generally include any device now known to those having ordinary skill in the art or developed in the future that is capable of presenting content to a viewer or other type of content consumer. Non-limiting examples of content presentation devices include televisions, smart televisions, laptops, personal digital assistants (PDAs), tablet computing devices, smartphones, personal computers (PCs), display monitors or terminals, radios, audio devices, speakers, headphones, haptic devices, electronic reading devices ("e-readers"), light emitting diode (LED) devices, organic LED (OLED) devices, wearable screens, set-top-boxes, satellite receivers, video-on-demand (VOD) receivers, content receivers (e.g., Apple TV® manufactured by Apple Inc. of Cupertino, Calif., United States; Roku® manufactured by Roku, Inc. of Saratoga, Calif., United States), digital video recorders (DVRs), personal video recorders (PVRs), hard drives, flash drives, storage servers, digital video disc (DVD) devices, Blu-Ray™ devices, or the like. A recipient, viewer, audience member, or the like may generally include an individual viewing, watching, listening to, consuming, recording, streaming, or otherwise interacting with content using a content presentation device.

A content originator may include any entity capable of providing content and/or digital on-screen graphics. A content originator may include any type of content developer known to those having ordinary skill in the art, such as an advertiser, an advertising agency, a television studio or broadcast network, a radio channel, a website provider, a VOD service, a content storage and delivery service, or the like.

In some embodiments, a content originator may generate campaign information relating to an advertising schedule or campaign, campaign goals, and/or campaign restraints. A campaign may generally refer to one or more content presentations (e.g., "creatives") related to a particular product, service, content offering, and/or generally related by a common idea or theme. For instance, an advertiser may define a target audience along with a target level of viewership over a specified period of time. In addition, an advertiser may set constraints against where or when their advertisement content assets may be distributed (or "play out"). For example, an advertiser may not want an advertisement to play out on children's' networks, overnight, or in a specific market or zone. An advertiser may be an external advertiser or may be a service provider promoting programming or other products. Goals may be defined using various types of goals known in the art, such as a target number of impressions against a specific audience (for example, 1,000,000 impressions from adults age 18-49) for a specific time period (for example, a campaign set to run over a two-week period). Goals may be stated in terms of measurable viewership metrics that can be used as collected to adjust goals over the course of the campaign. In an example having a 1,000,000 impressions goal over a two-week campaign, if after the first week, 200,000 impressions had been delivered, the goal for the second week would be 800,000 impressions.

In some embodiments, the management system may enable the targeting of digital on-screen graphics based on specific viewer criteria (i.e., target information) and related programming context. For example, past and/or current device level viewing related information may be used by the management system to cause the presentation of digital on-screen graphics that are more relevant to a viewer as well as more efficient and effective for service providers and/or content originators, such as television program marketers and other types of advertisers. In addition, the management system may enable the timely use of digital on-screen graphics associated with time-shifted viewing, such as video-on-demand (VOD) or digital video recorders (i.e., PVRs, DVRs, or the like). For example, the management application may be configured to replace original graphics with targeted graphics or more recent non-targeted digital on-screen graphics ("updated graphics") in time-shifted content.

In some embodiments, the presentation of targeted graphics may involve the use of device-level viewing data associated with unique identifiers of the content presentation devices ("device identifiers"). In some embodiments, the device identifiers may include hashed, encrypted, or otherwise processed content process device identifiers. In this manner, the management system may be able to target viewers without using any personally identifiable information (PII), for example, to ensure proper consumer-privacy compliance. Device-level viewing data may be used to classify content presentation devices according to various characteristics, such as prior viewers of programs and genres within a time-frame, or even current viewers of a specific program or genre. For examples, a television that has tuned into sports-related programming may be classified as having an interest in sports. In another example, a mobile computing device used to stream on-demand video content relating to action movies may be classified as having an interest in action movies.

In some embodiments, detection of device-level exposure of primary content offerings associated with the presentation of digital on-screen graphics may include determining which content has been viewed by a content presentation device and matching that information with which content has been associated with digital on-screen graphics. In some embodiments, detection of device-level exposure of primary content offerings may be implemented using automated content recognition (ACR) of the underlying program and the related expected timing of the digital on-screen graphic(s) relative to the related program timing on a content presentation device. In some embodiments, the expected timing associated with each presentation of a digital on-screen graphic may be derived from graphic presentation information provided by a service provider relating to the presentation of digital on-screen graphics. For example, the graphic presentation information may include an integrated play-out system log file that generates a record of all individual video and graphics that are composited to form part of a television network play-out stream.

In some embodiments using ACR, the detected automated content recognition of the program is used to determine the device-level timing relative to the expected on-air distribution feed. In some embodiments, the ACR component may be operative on a content presentation device. In some embodiments, the ACR component may be operative on a computing device associated with the management system and/or a service provider. Once the device-level timing for the program is determined, the expected timing of the digital on-screen graphic(s) may be used to trigger a device-level overlay of the target graphic to appear just before the original graphic. The target graphic overlay may remain visible during the expected duration of the original graphic, essentially covering at least a portion of the original graphic, so that the viewer is exposed to the targeted graphic overlay. The targeted graphic overlay may be used to deliver a targeted graphic that is associated with a particular program promotion aimed at a specific set of target viewers. For example, for promotion of an upcoming basketball game, a targeted graphic overlay may be shown to those content presentation devices that have been classified as having an interest in watching basketball, regardless of what program they are currently viewing.

In some embodiments, a campaign management application may be used for defining, planning, and measuring campaigns involving targeted graphics. The campaign management application may allow users, such as advertisers and marketers, to define viewer target segments based on past or present viewing behavior, as well as to associate specific targeted graphic overlays to any given segment for a campaign, such as a program promotion campaign. The campaign management application may also deliver timely information regarding the relative effectiveness of using digital on-screen graphics to drive program viewing, either stand alone or in conjunction with the use of other forms of program promotion, including, without limitation, on-air, cross-channel and paid program promotion ads and digital, social and other forms of related program promotion. In some embodiments, the campaign management application may be in communication with the management application. In some embodiments, the campaign management application is a component, module, program, or other element of the management application.

The methods and systems described according to some embodiments can be used with a variety of digital on-screen graphics used to promote program viewing, including but not limited to, exposures on linear television viewing, time-shifted television viewing via VOD and/or PVRs, online or streaming video using mobile computing devices, for example, when viewing takes place on devices enabled with the ability to detect the exposure of programming associated with digital on-screen graphics. Although linear television programming may be used in examples herein, embodiments are not so limited as any type of content presentation and/or consumption capable of operating according to some embodiments is contemplated herein.

FIG. 1 depicts an illustrative graphic management system according to some embodiments. As shown in FIG. 1, a service provider 105 may be configured to distribute content to various content presentation devices 160a-n. For example, the service provider 105 may be a cable television provider configured to distribute television programs and advertisements to subscriber set-top boxes 160d and/or televisions 160e and/or to stream VOD content to mobile computing devices 160a, 160n and smart phones 160b. The service provider 105 may include service provider computing devices 110a-n and may be in communication with service provider databases 115, which may include one or more of target information, campaign information, digital on-screen graphic content, expected presentation information, targeted presentation information. In some embodiments, the service provider databases 115 may include third-party databases, such as content databases and/or audience information.

The service provider 105 may be in communication with a content originator 140, such as an advertiser. In some embodiments, the service provider 105 may include and/or may be a content originator 140 (for example, when promoting service provider 105 content). The content originator 140 may include and/or have access to content originator computing devices 145, such as a server computing device, content originator content 150 and/or campaign information 155. In some embodiments, the content 150 may include a digital on-screen graphic. In some embodiments, the content 150 may include content that may be used to generate a digital on-screen graphic.

The content originator 140 may transmit content 150 and/or campaign information 155 to the service provider 105. The campaign information 155 may indicate which content is to be targeted to the content presentation devices 160a-n. For example, the campaign information 155 may specify that certain content 150 is to be presented to content presentation devices 160a-n associated with certain characteristics, such as location information, demographic information, preferences, type of content presentation device, and/or historical viewing patterns (for instance, interest in sports programming, regularly watch one or more particular programs, or the like). In some embodiments, the service provider 105 may generate and/or provide the content 150 based on the campaign information 155.

A management system 130 may be in communication with the content provider 105 and may include management system computing devices 135a-n, such as server computing devices configured to store information and/or perform functions described according to some embodiments herein. Although the management system 130 is depicted as being a component of the service provider 105 in FIG. 1, embodiments are not so limited, as the management system may be a separate component. In some embodiments, the content presentation devices 160a-n may include and/or be a management system 130, for example, executing the graphic management application.

The management system 130 may be configured to determine the expected presentation information, for example, based on information received from and/or detected from the content presentation devices 160a-n. For instance, the content presentation devices 160a-n may be configured to detect the content being presented thereon, such as through the use of ACR and/or by monitoring accessed content (for instance, using program guide information, VOD information, metadata associated with the content, data streaming information, or the like).

The management application 130 may use the campaign information to determine which of the content presentation devices 160a-n are targeted for a particular target graphic. In some embodiments, the target graphic may be generated by the service provider 105, the content originator 140, and/or the management system 130. In some embodiments, the target graphic may be generated by the content presentation devices 160a-n, for example, using content stored therein and/or received thereby. In some embodiments, the target graphic and/or portions thereof may be generated based on the original graphic, for example, to correspond to the original graphic. For instance, to ensure that the target graphic completely covers or overlays the original graphic. In some embodiments, the target graphic may not completely cover the original graphic, but may only overlay or replace a portion thereof. For example, the target graphic may only replace a relevant portion of an original graphic for the advertiser's or marketer's purposes, such as time information, images, or the like, instead of overlaying an entire original graphic.

The management system 130 may determine and/or receive expected presentation information indicating an expected presentation of an original graphic at a target content presentation device 160a-n. The expected presentation information may be based on, for example, timing information relating to the display time and/or duration of an original graphic within a primary content offering being displayed on a content presentation device 160a-n. For instance, the expected presentation information may specify that television 160e is watching television program A and/or network B and graphic presentation information may indicate that an original graphic having certain dimensions ("graphic dimensions") will be displayed during Program A and/or on network B at a certain location ("graphic location") on the screen from time x to time y ("graphic duration"). In another example, television program promotion graphic "A" that promotes program "X" is scheduled to air within program "Y" at "Z" minutes/seconds into the program with a scheduled duration of "N" minutes/seconds.

The management system 130 may generate targeted presentation information configured to trigger the targeted graphic to be presented at the target device during some or all of the graphic duration such that a viewer of the target device may see the target graphic instead of or along with all or a portion of the original graphic.

Figure 2:
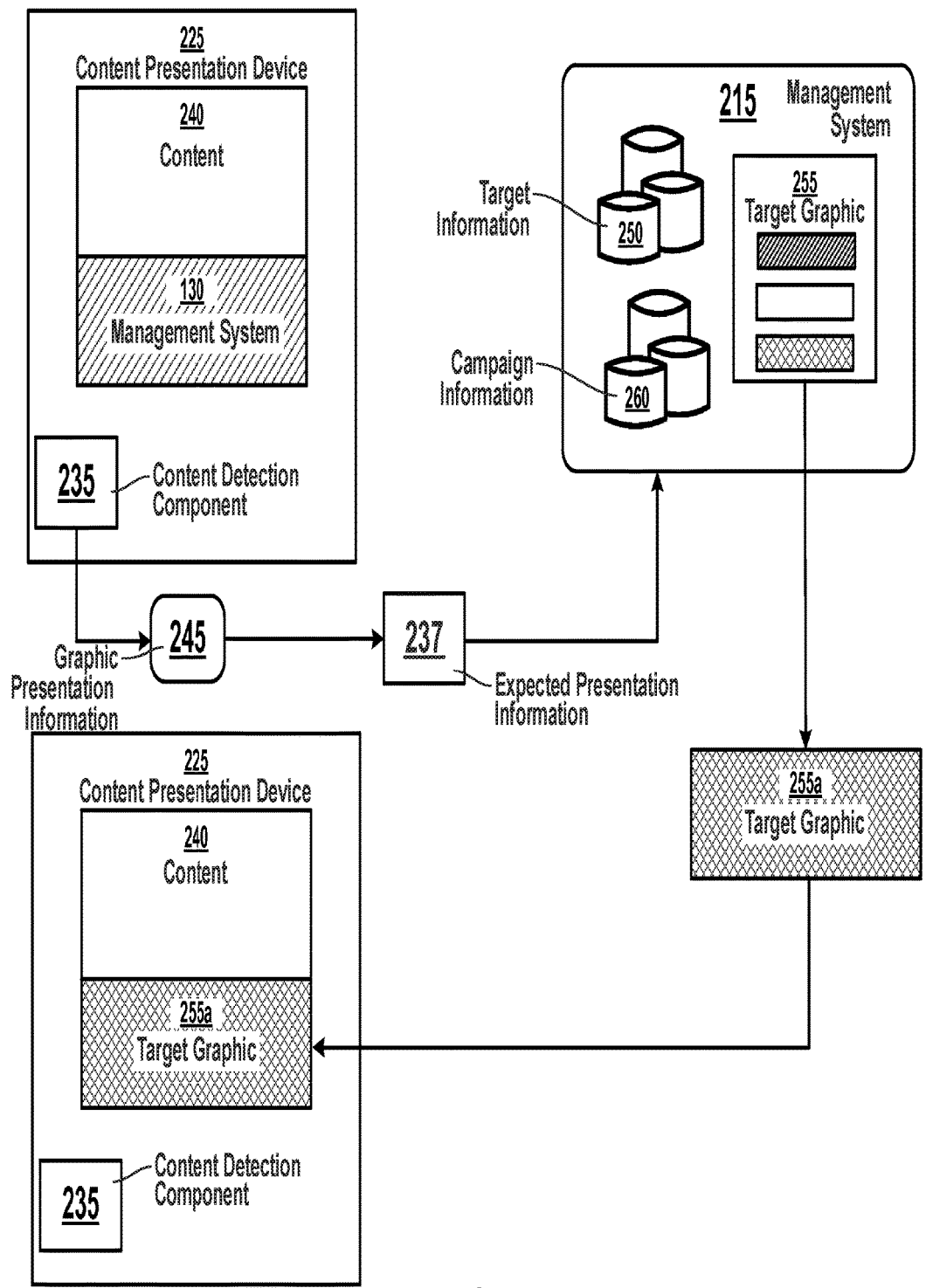
FIG. 2 depicts a flow diagram of presenting a target graphic at a content presentation device according to some embodiments.

FIG. 2 depicts a flow diagram of presenting a target graphic at a content presentation device according to some embodiments. As shown in FIG. 2, a content presentation device 225 may be presenting content 240. A content detection component 235, which may be or may include an ACR component, may detect which particular content 240 and/or which time point of the content is being presented via the content presentation device 225 ("content presentation information"). The management system 215 may receive the content presentation information and may access graphic presentation information 245 to generate expected presentation information 237 for the display of an original graphic. The management system 215 may access target information 250 to obtain and/or generate target graphic 255. A target graphic 255a may be selected based on campaign information 260 and the target information 250. The target graphic may be transmitted to the content presentation device 225, for instance within a network broadcast stream, to be presented as a digital on-screen graphic during the presentation of the content 240. In some embodiments, the management system 215 may trigger the presentation of the target graphic to be displayed on the content presentation device 225 by generating and/or transmitting targeted presentation information (for example, via a message) to the content presentation device 225. In some embodiments, the management system 215 may transmit the message to a service provider or other system that may relay the message to the content presentation device 225.

Figure 3:
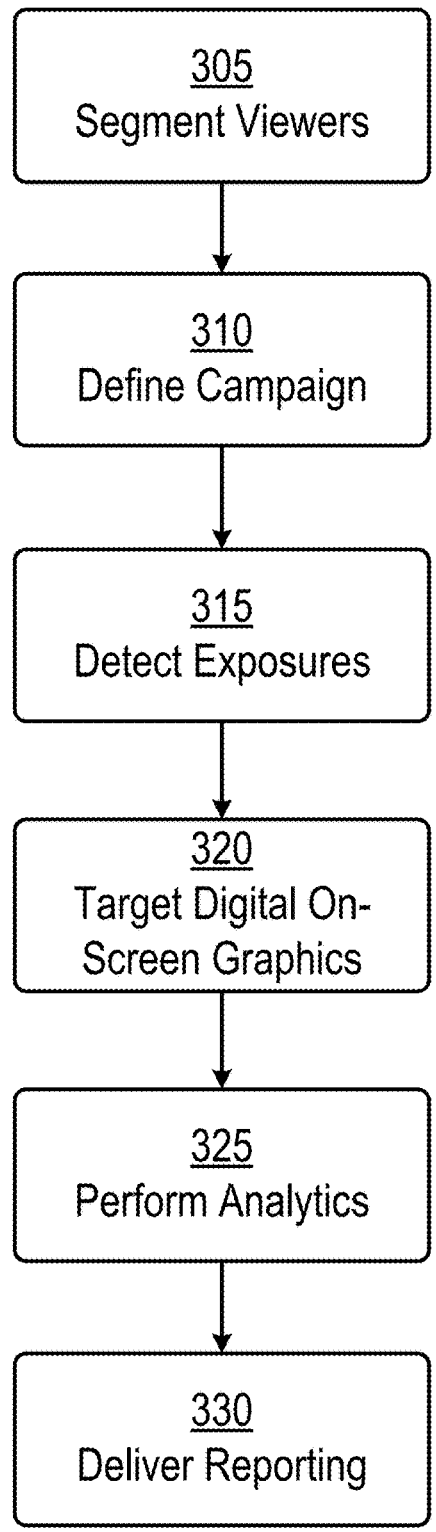
FIG. 3 depicts a flow diagram for an illustrative method of presenting a target graphic according to some embodiments.

FIG. 3 depicts a flow diagram for an illustrative method of presenting a target graphic according to some embodiments. Viewers may be segmented 305, for example, through the use of device-level viewing data to classify viewers (or content presentation devices of viewers). For instance, viewers may be classified as viewers of programs and genres, such as within a particular time frame. In some embodiments, the viewers may be identified according to the unique device identifier of their content presentation device. In this manner, PII may not be required. In some embodiments, the device identifiers may include unique hashed device identifiers. In some embodiments, the resulting classifications may be allow for the segmentation of an available audience into target viewer segments.

A campaign may be defined 310, for example, a campaign may be set up for targeted on graphics by specifying related graphics associated with the promotion of a specific program and/or product and relating the targeted graphics to the target viewer segments. Exposures to original graphics may be detected 315. In some embodiments, ACR may be used to detect the underlying program associated with the timing of digital on-screen graphic(s) relative to the related program timing on any individual enabled device to trigger the potential use of a targeted device-level on-screen graphic overlay. Target graphics may be targeted 320 to viewers. For example, in some embodiments, the delivery of targeted device-level on-screen graphic overlays may be executed based on the campaign specific instructions as to which graphics are to be delivered to which devices associated with specific viewer segments, and potentially date/time and/or programming context conditions (for example, previously watched programs, content consumption duration, type of device, or the like).

Analytics may be performed 325 relating to the target graphics. In some embodiments, the management system, the content originator, and/or the service provider may conduct a series of analytics to provide context for the targeted graphics, assess the level of exposure and conversion to program viewing, and generate relevant report metrics. Such analytics may include how many devices were exposed to any given targeted graphic as well as those related to the same program promotion campaign, how many times and the related timing that each device was exposed to the targeted graphics associated with any given campaign, what proportion of the devices that detected viewing of the targeted promoted program were exposed to targeted graphics for the related program promotion campaign, as well as the corresponding program viewing conversion rates for various subsets of types, frequencies and timing of exposure to targeted on-screen graphics for the each program promotion campaign. Additional analytics may include a comparison of the relative effectiveness of using targeted graphics relative to original graphics, for example, in terms of related impact on program viewing.

Reports relating to the targeted graphics and/or the analytics may be delivered 330, for example, to the content originator and/or the service provider. For instance, reports may be delivered via physical or electronic means the relevant reporting information associated with the program viewing or other marketing (for example, product sales) impact of the targeted graphics.

Figure 4:
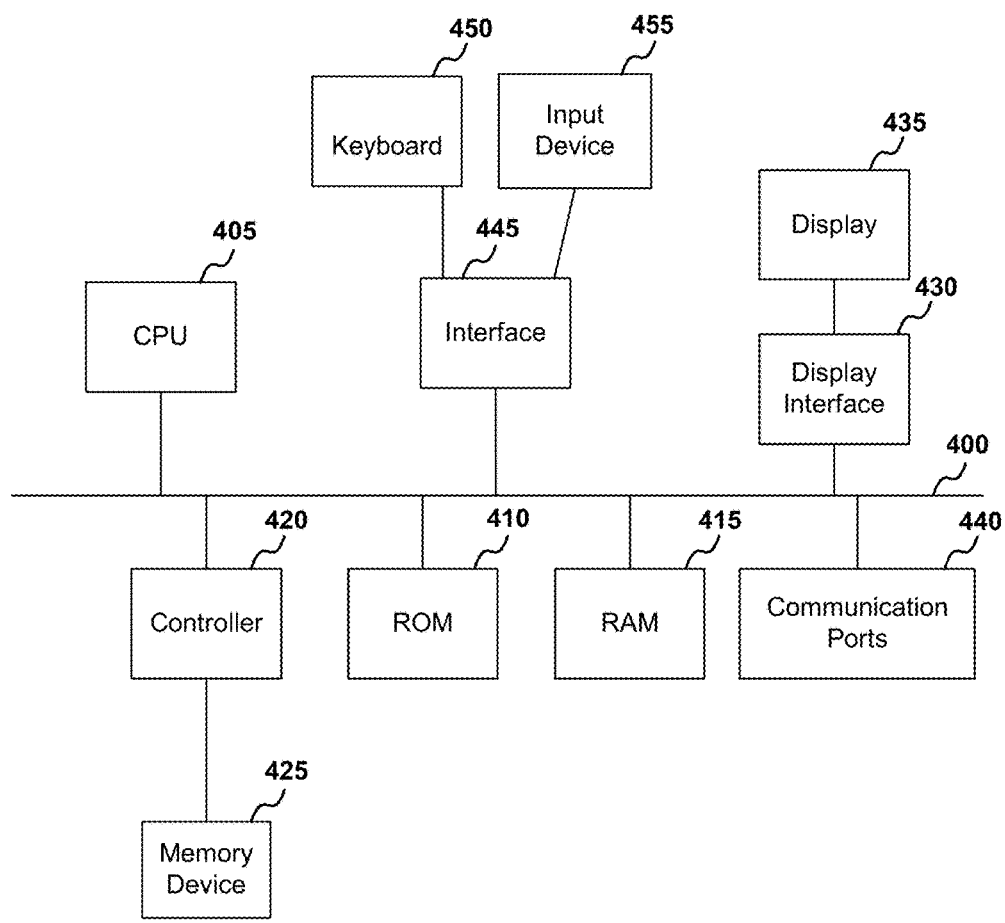
FIG. 4 depicts a block diagram of illustrative internal hardware that may be used to contain or implement program instructions according to an embodiment.

FIG. 4 depicts a block diagram of exemplary internal hardware that may be used to contain or implement program instructions, such as the modules and/or process steps discussed above in reference to FIGS. 1-3. A bus 400 serves as the main information highway interconnecting the other illustrated components of the hardware. CPU 405 is the central processing unit of the system, performing calculations and logic operations required to execute a program. CPU 405 is an exemplary processing device, computing device or processor as such terms are using in this disclosure. Read only memory (ROM) 410 and random access memory (RAM) 415 constitute exemplary memory devices.

A controller 420 interfaces with one or more optional memory devices 425 to the system bus 400. These memory devices 425 may include, for example, an external or internal DVD drive, a CD ROM drive, a hard drive, flash memory, a USB drive or the like. As indicated previously, these various drives and controllers are optional devices.

Program instructions, software or interactive modules may be stored in the ROM 410 and/or the RAM 415. Optionally, the program instructions may be stored on a tangible computer readable medium such as a compact disk, a digital disk, flash memory, a memory card, a USB drive, an optical disc storage medium, such as a Blu-Ray™ disc, and/or other recording medium.

An optional display interface 430 may permit information from the bus 400 to be displayed on the display 435 in audio, visual, graphic or alphanumeric format. Communication with external devices may occur using various communication ports 440. An exemplary communication port 440 may be attached to a communications network, such as the Internet or an intranet. Other exemplary communication ports 440 may comprise a serial port, a RS-232 port, and a RS-485 port.

The hardware may also include an interface 445 which allows for receipt of data from input devices such as a keyboard 450 or other input device 455 such as a mouse, a joystick, a touch screen, a remote control, a pointing device, a video input device, and/or an audio input device.

Computer program logic implementing all or part of the functionality previously described herein may be embodied in various forms, including, but in no way limited to, a source code form, a computer executable form, and various intermediate forms (for example, forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in a non-transitory form (for example, a source code form, a computer executable form, an intermediate form, or combinations thereof) in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink-wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

It will further be appreciated that the above-described methods and procedures may be provided using the systems disclosed herein, or on other types of systems. The methods and procedures, unless expressly limited, are not intended to be read to require particular actors or systems performing particular elements of the methods.

In the preceding specification, the present invention has been described with reference to specific example embodiments thereof. It will, however, be evident that various modifications and changes may be made thereunto without departing from the broader spirit and scope of the present invention. The description and drawings are accordingly to be regarded in an illustrative rather than restrictive sense.

What is claimed is:

1. A system comprising:
   a processor of a server; and
   a non-transitory, computer-readable storage medium in operable communication with the processor, wherein the computer-readable storage medium contains one or more programming instructions that, when executed, cause the processor to:
   receive target information associated with a plurality of content presentation devices;
   receive campaign information associated with one or more targeted on-screen graphics;
   determine, based at least on the received target information and the received campaign information, to present a targeted on-screen graphic of the one or more targeted on-screen graphics to at least one target device of the plurality of content presentation devices during presentation of content, wherein the targeted on-screen graphic is generated based on determining data previously viewed on the at least one target device;
   receive expected presentation information indicating a predetermined time duration for an expected presentation of an original on-screen graphic at the at least one target device; and
   generate, based on the expected presentation information, targeted presentation information to trigger the targeted on-screen graphic to be presented at the at least one target device during the predetermined time duration of the presentation of the original on-screen graphic such that the targeted on-screen graphic is visible and overlays at least a portion of the original on-screen graphic within the presented content such that the portion of the original on-screen graphic is not visible.

2. The system of claim 1, wherein the content presentation device comprises at least one of: a television, a set-top-box, a display monitor, a personal video recorder, a hard drive, and a content receiver.

3. The system of claim 1, wherein the target information comprises information indicating content presentation device viewer content interaction history.

4. The system of claim 1, wherein the target information comprises a unique device identifier associated with a content presentation device.

5. The system of claim 1, wherein the targeted on-screen graphic is generated based on graphic presentation information associated with the original on-screen graphic.

6. The system of claim 1, wherein the original on-screen graphic and the targeted on-screen graphic are received via a local area network.

7. A computer-implemented method comprising:
receiving, by a server, target information associated with a plurality of content presentation devices;
receiving, by a server, campaign information associated with one or more targeted on-screen graphics;
determining, by a server and based at least on the received target information and the received campaign information, to present a targeted on-screen graphic of the one or more targeted on-screen graphics to at least one target device of the plurality of content presentation devices during presentation of content, wherein the targeted on-screen graphic is generated based on determining data previously viewed on the at least one target device;
receiving, by a server, expected presentation information indicating a predetermined time duration for an expected presentation of an original on-screen graphic at the at least one target device; and
generating, by a server and based on the expected presentation information, targeted presentation information to trigger the targeted on-screen graphic to be presented at the at least one target device during the predetermined time duration of the presentation of the original on-screen graphic such that the targeted on-screen graphic is visible and overlays at least a portion of the original on-screen graphic within the presented content such that the portion of the original on-screen graphic is not visible.

8. The method of claim 7, wherein the content presentation device comprises at least one of: a television, a set-top-box, a display monitor, a personal video recorder, a hard drive, and a content receiver.

9. The method of claim 7, wherein the target information comprises information indicating content presentation device viewer content interaction history.

10. The method of claim 7, wherein the target information comprises a unique device identifier associated with a content presentation device.

11. The method of claim 7, wherein the targeted on-screen graphic is generated based on graphic presentation information associated with the original on-screen graphic.

12. The method of claim 7, wherein the original on-screen graphic comprises a bug embedded in or overlaid on the content.

13. A non-transitory computer-readable storage medium having computer-readable program code stored thereon, the computer-readable program code, when executed by a processor of a server, causing:
receiving target information associated with a plurality of content presentation devices;
receiving campaign information associated with one or more targeted on-screen graphics;
determining, based at least on the received target information and the received campaign information, to present a targeted on-screen graphic of the one or more targeted on-screen graphics to at least one target device of the plurality of content presentation devices during presentation of content, wherein the targeted on-screen graphic is generated based on determining data previously viewed on the at least one target device;
receiving expected presentation information indicating a predetermined time duration for an expected presentation of an original on-screen graphic at the at least one target device; and
generating, based on the expected presentation information, targeted presentation information to trigger the targeted on-screen graphic to be presented at the at least one target device during the predetermined time duration of the presentation of the original on-screen graphic such that the targeted on-screen graphic is visible and overlays at least a portion of the original on-screen graphic within the presented content such that the portion of the original on-screen graphic is not visible.

14. The non-transitory computer-readable storage medium of claim 13, wherein the content presentation device comprises at least one of: a television, a set-top-box, a display monitor, a personal video recorder, a hard drive, and a content receiver.

15. The non-transitory computer-readable storage medium of claim 13, wherein the target information comprises information indicating content presentation device viewer content interaction history.

16. The non-transitory computer-readable storage medium of claim 13, wherein the target information comprises a unique device identifier associated with a content presentation device.

17. The non-transitory computer-readable storage medium of claim 13, wherein the computer-readable program code, when executed by the processor, further causes:
determining viewership analytics of the plurality of content presentation devices, wherein the viewership analytics comprises advertising effectiveness of viewing the targeted on-screen graphic relative to viewing the original on-screen graphic, and
wherein the viewership analytics of the plurality of presentation devices further comprises at least one of:
a number of the plurality of content presentation devices exposed to the targeted on-screen graphic; a number of the plurality of content presentation devices exposed to other targeted on-screen graphics associated with the campaign information; a number of times each device of the plurality of content presentation devices was exposed to the targeted on-screen graphic; and a timing associated with each exposure of the targeted on-screen graphic.

* * * * *